UNITED STATES PATENT OFFICE.

HARRY WILLIAMS CHARLTON, OF JONES POINT, NEW YORK, ASSIGNOR TO AMERICAN POTASH CORPORATION, A CORPORATION OF VIRGINIA.

HYDRATE OF LIME.

1,381,106.  Specification of Letters Patent.  Patented June 14, 1921.

No Drawing.  Application filed June 6, 1917.  Serial No. 173,104.

*To all whom it may concern:*

Be it known that I, HARRY W. CHARLTON, a citizen of Canada, residing at Jones Point, in the county of Rockland, State of New York, have invented certain new and useful Improvements in New Hydrate of Lime; and I do hereby declare the following to be a full, clear, and exact description of the invention, such as will enable others skilled in the art to which it appertains to make and use the same.

This invention relates to a new stable hydrate of lime containing less water of combination than the normal hydrate, that is, less than one molecular proportion of water for each molecular proportion of calcium oxid (CaO).

The invention is based upon the discovery that when the normal calcium hydrate or slaked lime $(Ca(OH)_2)$ or $(CaO.H_2O)$ is digested with water at a high temperature and pressure, the normal hydrate of lime loses a considerable proportion of its water of hydration and forms a stable hydrate containing considerably less water than does the normal hydrate. Analysis of different samples of the new hydrate, after it has been dried in the air by gentle heating, indicate that it has a composition represented approximately by the following formula $CaO.CaO.H_2O$, or a water content somewhat higher than that indicated by this formula; that is to say, analysis indicates that the new hydrate of lime contains approximately one-half or somewhat more than one-half, the molecular water of hydration that is contained by the normal hydrate of lime or slaked lime, (or that the new hydrate of lime contains somewhat more than one-half of this amount of water of hydration.)

The new hydrate of lime can be produced, for example, by digesting slaked lime with a sufficient excess of water to permit of easy agitation at a steam pressure of two hundred and seventy pounds per square inch, and at a corresponding temperature, for about half an hour. The new hydrate on filtering is a putty-like mass which dries in the air with gentle heating (*e. g.* on a steam coil) to a coherent mass having a china-like ring. Although a large excess of water was present during the digestion, nevertheless a sample of the air dried hydrate produced as described showed an ignition loss of slightly more than 15% whereas the water content of ordinary slaked lime, such as that forming the starting material of the above example is about 24.6%.

The new hydrate has similarly been produced by digestion of five hundred parts of slaked lime with about five thousand parts of water at a pressure of about two hundred and twenty-five pounds per square inch, and at a corresponding temperature, for about half or three-quarters of an hour; and a product has been obtained which, after drying in the air, shows a loss on ignition of about 15.7%.

The relative proportions of lime and of water, as well as the temperature and pressure of digestion, and the time of digestion, can be varied from those indicated above. So also, the loss on ignition of the resulting product will vary somewhat with the nature and amount of the impurities present, the care with which the product is dried, and other factors.

On standing for considerable periods of time, the new hydrate has been found to slowly absorb moisture and carbon dioxid with resulting partial conversion into a carbonate or into a higher hydrate. Thus samples of the new hydrate, after standing for some months exposed to the air, showed an ignition loss of about 16.5%.

The specific gravity of the new product, as indicated by certain specimens thereof, has been found to be about 1.95, whereas the specific gravity of calcium oxid (CaO) is 3.25 and that of the common slaked lime or calcium hydroxid $Ca(OH)_2$ is 2.078. Accordingly, although the new product is intermediate in its degree of hydration between the anhydrous calcium oxid and the normal calcium hydrate, its specific gravity is less than that of either of these known products.

The new product before drying seems to have characteristic properties making it resemble putty and adapting it to be molded. So also, the new hydrate possesses characteristic properties when used in the production of certain plastics, possessing superior bonding properties, for example, when used in the manufacture of sand-lime bricks or insulators. I do not however claim the production of such sand-lime bricks or insulators herein as such bricks form the subject-matter of a separate application.

The new hydrate of lime can also be produced in intimate admixture with other materials by adding such materials to the slaked lime before digestion, or by adding materials which will react with part of the lime during digestion to form reaction products which will remain intimately admixed with the new hydrate at the end of the digestion.

I claim:—

1. A new stable hydrate of lime having, after air-drying from admixture with an excess of water, less water of hydration than the normal hydrate or calcium hydroxid $Ca(OH)_2$.

2. A new stable hydrate of lime having, after drying from admixture with an excess of water, a composition indicated approximately by the formula $CaO.CaO.H_2O$.

3. A new stable hydrate of lime resulting from the digestion of slaked lime with an excess of water at a high temperature and pressure, said product containing less water of hydration than slaked lime $Ca(OH)_2$.

4. A new stable hydrate of lime having, after air drying from admixture with an excess of water, a specific gravity less than that of the normal hydrate $Ca(OH)_2$.

5. A new stable hydrate of lime having a specific gravity when dried from admixture with an excess of water of about 1.95.

6. A new stable hydrate of lime resulting from the digestion of slaked lime with water at a high temperature and pressure, said hydrate being a plastic and putty-like mass before drying.

7. A new stable hydrate of lime which forms on drying from admixture with an excess of water a coherent mass having a china-like ring, and containing less water of hydration than the normal hydrate or calcium hydroxid $Ca(OH)_2$.

8. A new stable hydrate of lime which in an air dried state loses about 15% of its weight on ignition.

9. A new stable hydrate of lime resulting from the digestion of slaked lime with water at a high temperature and pressure, said hydrate being before drying a plastic putty-like mass, and drying to a coherent mass having a china-like ring and having a specific gravity of about 1.95 and containing less water of hydration than does the normal hydrate of lime.

10. The method of making a new hydrate of lime containing less water of hydration than the normal hydrate, which comprises digesting lime with an excess of water at a high temperature and pressure.

11. The method of making a new hydrate of lime containing less water of hydration than the normal hydrate, which comprises digesting slaked lime at a high temperature and pressure.

12. The method of making a new hydrate of lime containing less water of hydration than the normal hydrate, which comprises digesting slaked lime with an excess of water at a pressure of about two hundred and twenty-five to two hundred and seventy pounds per square inch and at a corresponding temperature.

In testimony whereof I affix my signature.

HARRY WILLIAMS CHARLTON.